March 7, 1939.  H. BECKER  2,149,384

VIEW FINDER FOR PHOTOGRAPHIC CAMERAS

Filed April 21, 1937

INVENTOR
Helmut Becker
BY
Ivan E. A. Konigsberg
ATTORNEY

Patented Mar. 7, 1939

2,149,384

UNITED STATES PATENT OFFICE 2,149,384

VIEW FINDER FOR PHOTOGRAPHIC CAMERAS

Helmut Becker, Wetzlar, Germany, assignor to Ernst Leitz, G. m. b. H., Wetzlar, Germany Application April 21, 1937, Serial No. 138,101 In Germany April 25, 1936

1 Claim. (Cl. 88—1.5)

This invention relates to view finders with adjustable masks for framing the field of view for use on photographic cameras. Such finders may be adjusted by means of an adjusting ring or like element having a scale indicating the focal length of the objective which happens to be used. Photographic cameras may be adapted for use with photographic objectives of various focal lengths and since the field of view taken in by a lens depends upon its focal length, the field of view which appears upon the film or ground glass of the camera varies with the focal length of the selected camera objective. In order that the field of view which is framed within the view finder shall correspond to the field of view which will be photographed on the film it is necessary to provide a finder in which the size of the field of view may be adjusted with each lens change in the camera. It is also desirable to provide a finder which may be adjusted without interference with any other part of the camera. Cameras are sometimes so constructed that parts thereof on the upper portion of the housing interfere or obscure to some extent the operations of the view finder. The object of this invention is to provide a view finder in which the mask is adjusted by operation of the ocular mounting whereby the same may be adjusted free from hindrance by other parts of the camera.

In the drawing accompanying this specification and illustrating the invention

Figure 1:
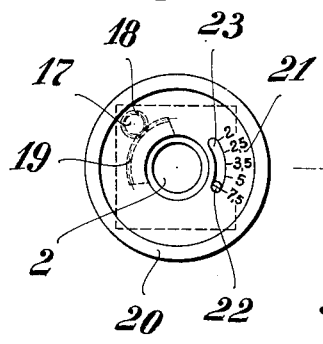
Fig. 1 is an end view of the finder looking at the ocular.
Figure 2:
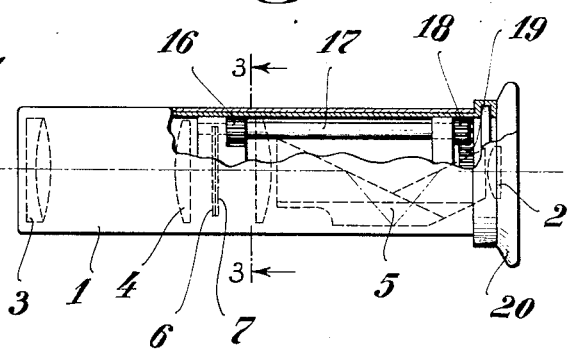
Fig. 2 is a side view with parts broken away and in section to expose the interior construction.
Figure 3:
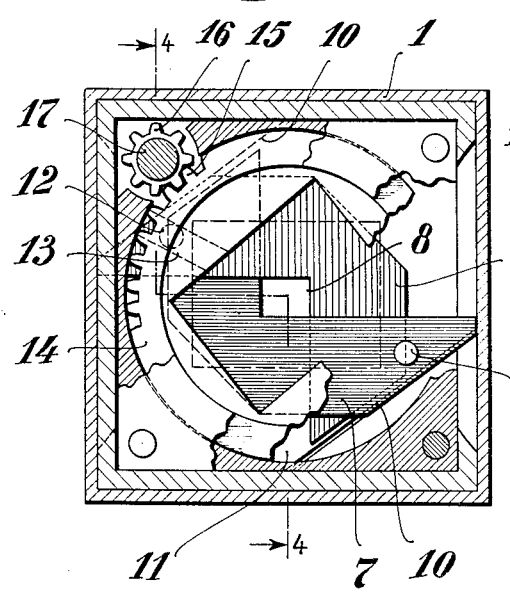
Fig. 3 is an enlarged cross sectional view taken substantially on the line 3—3 of Fig. 2.
Figure 4:
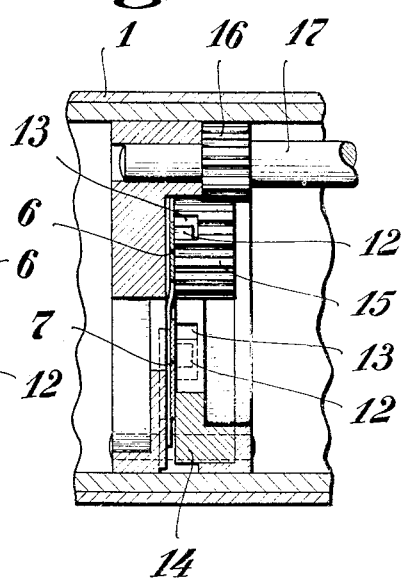
Fig. 4 is a sectional view on the line 4—4 of Fig. 3 with parts broken away.

The view finder consists of a tubular casing 1 which is adapted to be attached to or placed within a camera as a self-contained unitary device. Within the casing there is mounted a suitable optical finder system which includes the ocular 2, the objective 3 and interposed lenses and prisms 4 and 5. The finder mask consists of two lamellae 6 and 7 adapted to be adjusted so as to form a view finder opening 8.

The lamellae slide in inclined guide ways 10 in the supporting walls 11. Each lamella carries a pin 12 which engages a slot 13 in an adjusting ring 14 which is provided with a toothed segment 15. The latter meshes with a gear 16 on a shaft 17. Near the ocular the shaft carries another gear 18 which also engages a toothed segment 19. The latter is attached to and rotates with the ocular ring mounting 20. The ocular mounting carries a focal scale 21 to be read with reference to a fixed index pin 22 which appears through a slot 23.

By rotating the ocular mounting the lamellae 6 and 7 are adjusted through the described instrumentalities to accord with a focal length indicated on the scale 21 with reference to the index pin 22.

When the ring 14 is rotated, the slots 12 by engagement with the lamellae pins 13 moves the lamellae in the guide ways 10 to increase or decrease the finder view opening 8.

I claim:

A photographic view finder comprising a casing, an optical view finder system within the casing, movable mask members in said system for rectangularly framing the field of view, a toothed rotatable ring operatively connected to the mask members to move and adjust the same to frame the field of view, an ocular in said optical system, a rotatable mounting for said ocular, a pin in said view finder in fixed relation to the optical axis of the view finder, a scale on said mounting indicating the extent of its rotation with relation to said fixed pin whereby to adjust the said mask members to frame the field of view in accordance with the focal length of a camera objective with which said view finder is used, a toothed segment secured to the ocular mounting, a shaft and pinions on said shaft in mesh with the said segment and toothed ring for operating the latter when the said ocular mounting is rotated.

HELMUT BECKER.